though other proportions can be employed if desired; however, mixtures containing less than one part of partially digested sludge to four parts of fresh sludge should be avoided because of insufficient seeding of the fresh sludge. The partially digested sludge contains anaerobic bacteria, and, when such anaerobic bacteria are mixed with the fresh sludge in the mixer 30, the fresh sludge becomes inoculated with anaerobic bacteria to provide a fresh sludge mixture which is alkaline. In practice, the pH of the fresh sludge mixture in the mixer 30 is usually about 7.0 to 7.5.

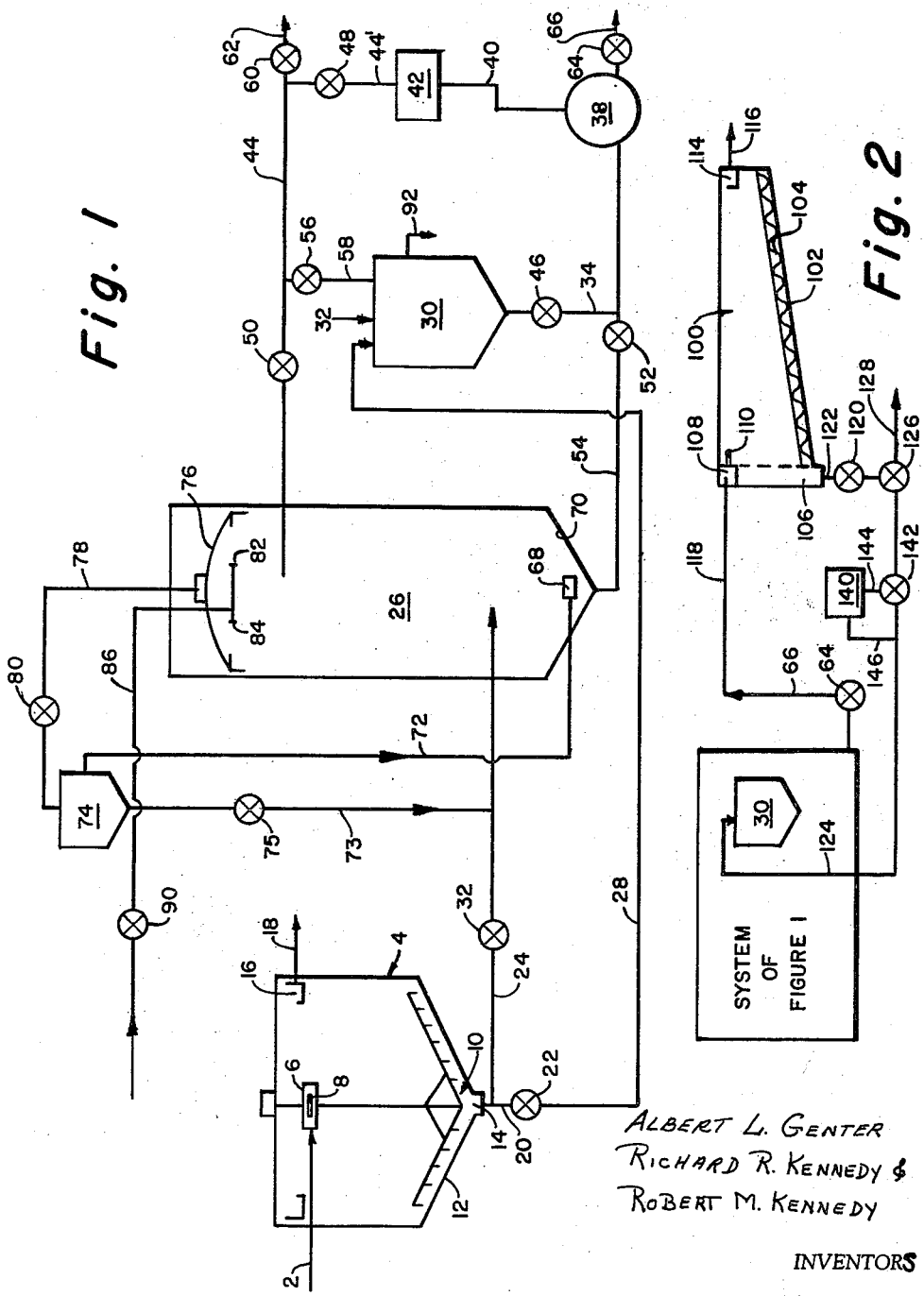

United States Patent Office 3,105,041
Patented Sept. 24, 1963

3,105,041
SEWAGE SLUDGE DIGESTION PROCESS
Albert L. Genter, Wyman Park Apts., Baltimore, Md., and Richard R. Kennedy and Robert M. Kennedy, both of 604 Mission St., San Francisco 5, Calif.
Filed Sept. 9, 1960, Ser. No. 54,918
15 Claims. (Cl. 210—6)

This invention relates to sewage treatment, and more particularly, to a process and system for anaerobic sewage digestion particularly adapted to handle the waste materials of communities having a population of approximately 10,000 persons or less.

As explained in our U.S. Patent 2,893,957, issued July 7, 1959, the time required for active anaerobic digestion of sewage can be definitely diminished when: (1) the digesting mass is vigorously agitated to effect equal distribution of the partially and more completely digested materials of the mass with inoculating seed; and (2) when there is a frequent pumpage of seeded, undigested material into the active digesting mass. According to our aforementioned patent, vigorous agitation and frequent pumpage of seeded, undigested material into the active digesting mass are accomplished by using a two-stage digestion system wherein the first stage includes at least two digestion units, and the second stage includes at least one digestion unit. Such a two-stage system is completely satisfactory and operates advantageously in plants for disposing of waste materials of highly populated areas. The system therein suggested is, however, not particularly well suited for low population waste material disposal plants, because it provides for utilizing a series of digestion units which necessarily are expensive to fabricate and install.

The present invention is directed to an improvement over the process and system disclosed in our above-cited patent. More specifically, the present invention has as one of its primary objects the provision of a process and system of treating fresh sludges in a minimum of space and equipment to convert the same into processed sludge suitable for delivery to sludge beds, which process and system provide for vigorous agitation of, and frequent pumpage of, seeded, undigested material into, the active mass of sludge being digested.

A still further primary object of the present invention is to provide a process and system for treating fresh sludge conforming with the preceding object and incorporating but one enclosed processing area or digesting unit.

Still further, other, and more specific, objects of the present invention are: (1) to provide a process and system of treating fresh sludge in a minimum of space and equipment to convert the same into processed sludge suitable for delivery to sludge beds, as prescribed above, wherein the system and process provide for mixing at least partially-processed sludge containing anaerobic bacteria with fresh sludge to form an inoculated fresh sludge mixture with an alkaline pH; (2) to provide such a process of treating fresh sludge wherein the sludge mixture being treated is circulated through the processing area or digesting unit while being heated and violently agitated; (3) to provide such a process of treating fresh sludge wherein after heating and agitation, the sludge mixture is diluted and allowed to remain quiescent in the processing area or digesting unit so that the sludge solids separate from the sludge liquor to form a processed sludge mixture suitable for delivery to sludge beds; and (4) to provide such a process of treating sludge wherein a controlled portion of processed sludge is withdrawn from the digestion area or unit and stored for re-introduction thereinto and mixture with a subsequent batch of fresh sludge.

The invention will be better understood and objects other than those specifically set forth hereinabove will become apparent to those of ordinary skill in the art when consideration is given to the following detailed description of the illustrative embodiments of the invention. To facilitate a complete understanding of such embodiments, reference is made to the annexed drawings, wherein:

FIGURE 1 is a schematic diagram and flow sheet presenting a system which can be operated in accordance with the present invention; and FIGURE 2 is a schematic diagram and flow sheet similar to FIGURE 1, but showing a system wherein processed sludge, such as that delivered from the system of FIGURE 1, is further treated prior to delivery to the sludge beds.

To facilitate treatment of sewage, it is common to deliver the sewage initially to a settling tank wherein the sewage solids are generally separated from the sewage liquids. As a result, one obtains (a) a fresh sludge, comprising the sewage solids and some liquids, which is to be processed, and (b) some comparatively clear liquid which is delivered to the settling tank with the untreated sewage, but which can be drained off to a suitable field. The present invention contemplates an initial separation of the sewage to obtain such a sludge for further treatment, and thus, as shown in FIGURE 1, untreated sewage is passed through a conduit 2 into a settling tank 4. Preferably, the settling tank 4 is of a circular configuration, and is provided with a centrally-disposed influent well 6 provided with a series of T-shaped inlet heads 8 which cancel the velocity of streams issuing from such inlet heads as explained in our co-pending application Serial No. 825,442, filed July 7, 1959, now U.S. Patent 3,067,878. The settling tank 4 is also provided with a sludge collector or sweeper 10 having veins extending adjacent the bottom of tapered wall 12 of the tank 4 to move settled sludge toward the tank outlet 14. Such construction is also described in our aforestated co-pending application. Other publications disclose adequate settling tanks, however. While we have explained a particular type of settling tank above, and while such a settling tank is used in accordance with the preferred embodiments of the invention, it should be understood that any suitable settling tank may be used to separate a fresh sewage sludge from untreated sewage for further processing. Regardless of the tank used, however, normally the sludge settles to the bottom of the tank, and the clear sewage liquids overflow into a launder such as that designated by numeral 16 in FIGURE 1, and are then drained off for desired disposition through a conduit such as that designated by numeral 18.

The fresh sludge which is delivered to the outlet 14 of settling tank 4 passes into a conduit 20 having a valve 22 therein which serves to direct the fresh sludge into either conduit 24 leading directly into the processing area 26, or to the conduit 28 which leads directly to the input of a sludge mixer 30. Preferably, the conduit 24 includes a valve 32 which is normally maintained closed, and preferably the valve 22 is normally maintained open so that fresh sludge is passed directly to the sludge mixer 30.

The sludge mixer 30, or as it may be termed, the sludge receiving and distributing unit, contains partially processed sludge with anaerobic bacteria therein, and serves to mix such processed sludge with the fresh sludge entering through conduit 28 to provide a fresh sludge mixture.

Preferably, two parts of fresh sludge are mixed with one part of at least partially digested sludge in the mixer 30, and the mixture is maintained with an alkaline pH. To maintain the alkalinity of the mixture, milk of lime or any other suitable alkaline substitute may be added through the conduit 32 leading into the mixer 30.

The fresh sludge and the partially-processed sludge pass through an outlet conduit 34 and a pump inlet conduit 36 to a circulating pump 38 which pumps the mixture through a conduit 40, heater 42, and inlet line 44 into the enclosed processing area or digesting unit 26. For such operation, the valve 46 in conduit 34, the valve 48 in conduit 44', and the valve 50 in conduit 44 are maintained open, and the valve 52 in conduit 54 and the valve 56 in conduit 58 are maintained in closed position.

After the processing area or digesting unit 26 has been filled to a suitable level, the valve 46 in the outlet conduit of the mixer 30 is closed and the valve 52 in the outlet conduit 54 of the digesting unit 26 is opened. During all of the aforementioned operations, the valve 60 in the drain-off conduit 62 is closed and the valve 64 in the drain-off conduit 66 is closed.

From the foregoing description, it should be apparent that the initial steps of the process provided by the invention are conducting fresh sludge to a unitary enclosed processing area and introducing at least partially-processed sludge containing anaerobic bacteria into the processing area to form an inoculated fresh sludge mixture with an alkaline pH in such area. It should also be apparent that according to the preferred operation described above, the fresh sludge is mixed with the partially-processed sludge in a mixer or sludge receiving and distributing unit 30 prior to conduction of the fresh sludge, and introducing of the at least partially-processed sludge, within the processing area or digestion unit 26.

After the inoculated fresh sludge mixture, or a suitable amount thereof, has been placed in the digestion unit 26, and after valve 46 and valve 52 have been closed and opened respectively, then circulating pump 38 serves to continuously circulate the inoculated fresh sludge mixture through the processing area or digesting unit 26 and also serves thereby to agitate such mixture. It will be noted that, as suggested above, a heating unit 42 is provided in the circulating path extending through conduit 54, conduit 36, circulating pump 38, conduit 40, conduit 44', and conduit 44. The heating unit serves to maintain the temperature of the inoculated fresh sludge mixture at a suitable level for anaerobic bacteriological action, i.e., at a temperature from about 20° C. to 60° C.

Although the recirculating pump 38 provides for some severe agitation of the inoculated fresh sludge mixture, preferably agitation of such mixture is further stimulated by introducing compressed gas into the enclosed processing area or digestion unit 26 through a variable-speed gas blower 68 disposed centrally of, and near the bottom 70 of the enclosed area or digestion tank 26. Compressed gas is fed to the blower 68 through a conduit 72 extending from a compressed gas source 74.

A floating gas dome 76 is provided at the upper end of the processing area or digesting unit 26 and a gas outlet conduit 78 extends therefrom to the compressed gas source 74 to feed gases exiting from the top of the unit 26 to the compression source. A valve 80 is provided in the conduit 78, and by adjustment of the valve 80 the flow of compressed gas through the digestion unit, and thereby the degree of agitation of the sludge mixture within the unit, can be controlled.

It has been found that in most instances during violent agitation of the mixture a froth collects at the top of the sludge mixture undergoing treatment in the processing area or digesting unit 26 due to the active digestion. Such froth may be dispersed and forced to yield its floated solids by means of water sprays issuing from nozzles such as those schematically presented in FIGURE 1 and designated by numerals 82 and 84. A suitable water line 86 leads to such nozzles, and is provided with a valve 90 so that the sprays may be cut on or off as desired.

During recirculation and processing of the sludge mixture, alkaline conditions should be maintained at all times. For this purpose, as suggested above, a suitable alkaline chemical solution may be introduced into the mixer through the conduit 32, and the valve 46 can be opened to allow the solution so introduced to pass into the mixture circulating through conduit 54 by virtue of the pumping action of the recirculating pump 38.

After the sludge has been at least partially processed by continuous recirculation as described above, then the same is diluted by passing water into the mixture through the conduit 86 and spray nozzles 82 and 84. The mixture which is partially treated sludge, consists of a sludge liquor and sludge solids, and the water which is introduced is purer than the sludge liquor and serves to dilute the partially-treated sludge mixture. After the mixture has been sufficiently diluted, the valve 90 in the water line 86 is closed, and either then, or preferably previously, the recirculation pump 38 is stopped and the partially-treated and diluted sludge mixture is allowed to remain quiescent in the enclosed processing area or digestion unit 26 whereby the sludge solids of the mixture separate from the diluted sludge liquor, and a processed sludge mixture exists in the processing area or digestion unit 26 which is suitable for delivery to sludge beds.

When the sludge mixture undergoing treatment has remained quiescent for separation as desired, then valve 48 in conduit 44', and valve 56 is conduit 58 are closed, and valve 60 in drain-off line 62 is opened. The valve 50 having previously been opened does not interfere with drain-off of the processed sludge liquors through conduit 62 and thus by virtue of the valve operation described immediately above, the processed sludge liquors are passed to a suitable drain field.

Either simultaneously therewith, or after the sludge liquor has been drained off, the valve 64 in the drain-off line 66 is opened, and the valve 46 in conduit 34 and valve 48 in conduit 44' are closed, and the sludge solids are drained out of the processing area or digestion unit 26 through conduit 66. If necessary, the circulating pump 38 can be used to pump the solids out of the digestion unit 26.

It is important to understand that all of the processed sludge is not drained off according to the invention. Instead, at least a portion of the processed sludge is stored for subsequent mixing with fresh sludge to be treated.

In the system shown in FIGURE 1, a liquid portion of the processed sludge may be stored in the mixer 30 by closing valves 60 and 48 and opening valves 50 and 56 whereby the processed sludge liquor drains into the mixer. To store a portion of the solid processed sludge, the valve 50 is closed and the valve 46 is closed, but the valves 52, 48 and 56 are opened so that the circulating pump 38 can be activated to pump the processed solid sludge into the mixer 30 through the inlet conduit 58 leading thereto.

Preferably the mixer 30 is provided with an overflow conduit 92 so that if too much liquid enters the mixer, the same will overflow in much the same manner as liquid overflows from the launder 16 of the settling tank 4 described initially in connection with FIGURE 1.

By again referring to FIGURE 1, it will be noted that while the processing of the sludge is carried out in the processing area or digestion unit 26, untreated sewage can be conducted to the settling tank 4 and allowed to settle therein, so that after processing of one batch of sludge is completed in the area or unit 26, another batch of sludge can be immediately passed thereto for processing. Of course, for this purpose, the valves 22 and 32 are maintained closed during the time that some sewage is settling in the tank 4 and other sewage is being treated in the unit 26.

While it has been assumed hereinabove that the process is initiated by conducting the fresh sewage through the conduit 28 to the inlet of the mixer 30, it should be understood that the provision of a mixer 30, although preferred, can be eliminated. More specifically, in instances where cost is a primary factor due to the small population, the mixer 30 can be replaced or eliminated, and fresh sewage can be fed directly from a suitable settling tank such as that designated by numeral 4, through an inlet conduit extending directly into the digestion unit or processing area 26. More particularly, a conduit such as that designated by numeral 24 and provided with a valve 32 can be used for this purpose. A certain predetermined or controlled amount of processed sludge can be left in the bottom of the processing area or digestion unit 26, and if the mixer 30 is eliminated, then mixing of the partially-processed sludge with the fresh sludge takes place during circulation of the mixture as described above and during agitation of the same, as also described above. In other words, if desired, the mixing of the fresh sludge with the processed sludge can take place in the digesting unit itself, however, it should be understood that the provision of a mixer is preferred since it provides for greater uniformity of distribution of the processed sludge throughout the fresh sludge-processed sludge mixture.

Still another modified form of the invention provides for replacing the mixer 30 by a storage tank or other storing means whereby a portion of the processed sludge can be maintained separate from the digesting unit or processing area 26. According to this modification, fresh sludge is conducted directly into the digestion unit or processing area 26, and as the sludge is being passed into such area or unit, the circulating pump 38 serves to gradually pump processed sludge from the storage means provided into the digestion unit or area 26. This system is somewhat more efficient than merely leaving part of the processed sludge in the digestion unit and then passing fresh sludge therein, but, of course, is not as efficient as using a mixer 30.

From the foregoing discussion it should be apparent that the sludge being processed is mixed more or less on a continuous basis exterior of the digestion unit or processing area and is maintained active within the digestion unit or area during violent agitation thereof. This accomplishes three principal activities, all of which contribute to keeping the biological factors operating at peak capacity at all times. First, the active organisms are kept continuously in contact with the food supply; second, the food supply is uniformly distributed and made available to all of the active digestion organisms possible; and third, the concentration of the inhibitory biological intermediates and end products are maintained at a minimum level. All of these factors keep the working population of active organisms and their food supply cooperating at peak efficiency.

In addition to the advantages of the present invention set forth hereinabove, it should be pointed out that a further advantage lies in the provision of a system adapted to handle a higher percentage of solids than systems heretofore available. Authoritative investigation supported by the Public Health Service research grants (K–75) states that mixing of high-rate digesters becomes a problem as the total solids content of the mixed liquor approaches 6 percent. This is true of certain prior units. The basis for the percentage lies in the fact that the more volatile matter present in any sewage sludge, the less its specific gravity becomes and the more flocculent and more jelly-like it becomes. This quite evidently means that the sludge absorbs and adsorbs more water. In other words, with lower ash content and more volatile organic content, e.g., 35 percent fixed solids and 65 percent volatile matter, the voluminous nature of the solid portion of the sludge becomes so great that the solids are exceedingly difficult to settle under gravity. With the employment of sludge activation by aeration, this flocculent nature of the solids becomes more absorbent for air and gases. However, this limitation is readily overcome by the present invention which uses unaerated washing of the digested solids by relatively gas-free water through removing gas and entrained air from the solids. Because of this, the present invention provides for readily increasing the solid content of the sludge recirculated through the digester system. Even if the settling tank 4 is used for collecting secondary sludge solids of high volatile content prior to digestion, the return of elutriated digested solids to the mixer 30 for incubation purposes of the fresh sludge fed thereto from the tank 4, the recirculated elutriated digested sludge may easily contain 8 percent solids of higher moisture content and lower alkalinity than those in the report mentioned above. Elutriation increases the solids in any sludge and obviously adding such elutriated sludges back to digestion of fresh sludge will increase the solids in the fresh sludge and result in an increased percentage of solids in the sludge being processed.

Although the process of treating sludge described hereinabove is completely satisfactory in many instances and desirable for use in small population areas, by a further minimum expenditure, the system can be made somewhat more efficient. Particular reference is made to FIGURE 2, wherein the system of FIGURE 1 is shown in block form as coupled with an auxiliary outlet settling tank generally designated by the numeral 100. Preferably such tank is constructed in accordance with our application Serial No. 813,231, now Patent No. 2,973,866. Generally, such a settling tank includes a sloped bottom wall 102, and is provided with a sludge conveyor such as that schematically shown and designated by the numeral 104 which serves to convey settled sludge to an outlet 106 of the tank 100. In addition, the tank includes an inlet well 108 from which extend a plurality of T-shape distributing heads 110 which direct incoming streams against one another to cancel the inlet velocity of such streams. Of course, an overflow launder such as that designated by numeral 114 is provided so that the overflowing clear liquid can be drained through a suitable conduit such as 116 and returned to the plant influent 2 of FIGURE 1 or to the effluent 18.

Now, according to the present invention, a tank such as that designated by numeral 100 is coupled with the system of FIGURE 1 by connecting the drain line 66 with the inlet well 108 of the settling tank 100 by means of a suitable conduit such as that designated by numeral 118. Also, a pump such as that designated by numeral 120 is connected in an outlet conduit 122 extending from the outlet well 106 of the tank 100. The pump 120 is adapted to pump solids which have settled in the tank 100 back to the mixer 30 of FIGURE 1 through a suitable conduit such as that designated by numeral 124.

The pump conduit 122 leads into a valve 126 which may be of the commonly used three-way type, i.e., a valve which will allow material to pass therethrough in one of two selectable positions and which will prevent passage of material therethrough in a third position. By providing a valve such as that schematically shown and designated by numeral 126, the settled solids of tank 100 may be either pumped back to the mixer 30 or pumped out through a suitable conduit 128 to a drain field. Of course, the valve 126 can be closed so that no material will be pumped therethrough.

When the improved system of FIGURE 2 is used, then there is no need to leave the processed sludge mixture in the processing area or digestion unit 26 of FIGURE 1 to settle the solids of the processed sludge from the liquors thereof. Instead, after the sludge undergoing treatment has been suitably processed, and is ready for such settling, it can be drained through the outlet conduit 66 and conduit 118 coupled thereto from the processing area or digesting unit 26 to the settling tank or area 100.

Moreover, instead of diverting a portion of the processed sludge leaving the digestion unit or processing area 26 into the mixer 30, the processed sludge can all be passed to the settling tank 100, and then the controlled portion of the processed sludge to be returned for mixture with fresh sludge can be pumped by pump 120 through conduit 122, valve 126, and conduit 124 back to the mixer 30. The system of FIGURE 2 can thus handle a larger volume of waste, and accordingly has advantages over the system of FIGURE 1 in the somewhat more densely populated areas.

In certain instances it may be desired to heat the processed sludge being returned through conduit 124 from settling tank 100. For this purpose a heater unit 140 may be provided and coupled to conduit 124 via valve 142 and conduits 144 and 146 whereby sludge returning from settling area or tank 100 can be diverted through the heater 140 by operation of valve 142. Valve 142 preferably is like valve 126, i.e., a three-way valve as described. Moreover, although heater 42 has been shown as located between pump 38 and conduit 44 in the circulating system, it should be understood that heater 42 can be elsewhere located, as for example in conduit 54. The important factor is that the circulating sludge is suitably heated for desired anaerobic bacteriological action.

Similarly, pump 38 can be coupled in the system in a location other than that shown, however, preferably pump 38 is located so as to pump sludge out of drain conduit 66, as well through the unit 26 counter-clockwise as shown, and counter-current to the flow of compressed gas entering the vent 26 through blower 68.

One additional factor, not mentioned hereinabove, is that, if desired, a conduit such as that designated by numeral 73 and having a valve 75 therein, can be provided to feed compressed gas to conduit 24. Such gas when fed by opening valve 75 aids movement of sludge through conduit 24 and provides for agitation of such sludge. This is of particular importance when the modified system of the invention eliminating mixer 30 is used.

While the foregoing description sets forth return of processed sludge to mixer 30 at the end of processing each batch of sludge being treated, it should be understood that the return may be intermittent during treatment of each batch by adjusting the valves for return as desired, or the return can be made continuous by adjusting valve 56 so that a controlled amount of sludge is passed to mixer 30 during each circulation of a batch being treated as described.

After reading the foregoing detailed description of the invention, it should be apparent that the objects set forth at the outset of this specification have been successfully achieved. Undoubtedly, after reading the foregoing description, various modifications will become apparent to those of ordinary skill in the art, which modifications fall within the scope and spirit of the invention.

What is claimed is:

1. In a process of treating fresh sludges in a minimum of space and equipment to convert the same into processed sludge suitable for delivery to sludge beds, the steps of (1) conducting fresh sludge to a single enclosed digestion unit; (2) introducing at least partially-processed sludge containing anaerobic bacteria into said unit to form an inoculated fresh sludge mixture with an alkaline pH in said unit; (3) then circulating said fresh sludge mixture through said unit while heating said fresh sludge mixture and violently agitating said fresh sludge mixture to form a treated sludge mixture including sludge liquor and sludge solids; (4) then stopping said circulating and agitating and diluting said treated sludge mixture in said unit with water purer than said sludge liquor; (5) then allowing said partially-treated and diluted sludge mixture to remain quiescent in said unit whereby said sludge solids separate from said diluted sludge liquor to form a processed sludge mixture suitable for delivery to sludge beds; (6) withdrawing at least a portion of said processed sludge mixture from said unit; and (7) withdrawing a controlled portion of said processed sludge mixture from said unit and storing the same for reintroduction into said unit.

2. In a process of treating fresh sludges in a minimum of space and equipment to convert the same into processed sludge suitable for delivery to sludge beds, the steps defined in claim 1 and further including the step of adding an alkaline solution to said circulating sludge to maintain an alkaline pH in said unit.

3. In a process of treating fresh sludges in a minimum of space and equipment to convert the same into processed sludge suitable for delivery to sludge beds, the steps defined in claim 2 wherein said inoculated fresh sludge mixture comprises two parts of fresh sludge to one part of at least partially-processed sludge.

4. In a process of treating fresh sludges in a minimum of space and equipment to convert the same into processed sludge suitable for delivery to sludge beds, the steps defined in claim 1 wherein said inoculated fresh sludge mixture comprises two parts of fresh sludge to one part of at least partially-processed sludge.

5. In a process of treating fresh sludges in a minimum of space and equipment to convert the same into processed sludge suitable for delivery to sludge beds, the steps defined in claim 1 wherein said heating of said fresh sludge mixture maintains the same between 20° C. and 60° C.

6. In a process of treating fresh sludges in a minimum of space and equipment to convert the same into processed sludge suitable for delivery to sludge beds, the steps defined in claim 5 and further including the step of passing compressed gas through said unit countercurrent to the circulation of sludge therethrough to aid said agitation.

7. In a process of treating fresh sludges in a minimum of space and equipment to convert the same into processed sludge suitable for delivery to sludge beds, the steps defined in claim 1 and further including the step of passing compressed gas through said unit countercurrent to the circulation of sludge therethrough to aid said agitation.

8. In a process of treating fresh sludges in a minimum of space and equipment to convert the same into processed sludge suitable for delivery to sludge beds, the steps defined in claim 7 and further including the step of spraying said circulating sludge to destroy froth accumulations thereon.

9. In a process of treating fresh sludges in a minimum of space and equipment to convert the same into processed sludge suitable for delivery to sludge beds, the steps defined in claim 1 and further including the step of spraying said circulating sludge to destroy froth accumulations thereon.

10. In a process of treating fresh sludges in a minimum of space and equipment to convert the same into processed sludge suitable for delivery to sludge beds, the steps defined in claim 9 and further including the step of adding an alkaline solution to said circulating sludge to maintain an alkaline pH in said unit.

11. In a process of treating fresh sludges to convert the same into processed sludge suitable for delivery to sludge beds, the steps of conducting fresh sludge to a mixing station; mixing said fresh sludge with partially-processed sludge containing anaerobic bacteria to form an inoculated fresh sludge mixture; conducting said inoculated fresh sludge mixture to a single enclosed digestion unit; circulating said inoculated fresh sludge mixture through said unit while heating said inoculated fresh sludge mixture and violently agitating said fresh sludge mixture to form a treated sludge mixture including sludge liquor and sludge solids; then diluting said treated sludge mixture in said unit with water purer than said sludge liquor; then allowing said treated sludge mixture to remain quiescent in said unit whereby said sludge solids separate from said diluted sludge liquor to form a processed sludge mixture suitable for delivery to sludge beds; and conducting a controlled portion of said processed sludge mixture to said mixing station for mixing with fresh sludge.

12. In a process of treating fresh sludges in a minimum of space and equipment to convert the same into processed sludge suitable for delivery to sludge beds, the steps defined in claim 11 and further including the step of adding an alkaline solution to said circulating sludge to maintain an alkaline pH in said unit.

13. In a process of treating fresh sludges in a minimum of space and equipment to convert the same into processed sludge suitable for delivery to sludge beds, the steps defined in claim 11 wherein said heating of said fresh sludge mixture maintains the same between 20° C. and 60° C.; and further including the step of passing compressed gas through said area countercurrent to the circulation of sludge therethrough to aid said agitation.

14. In a process of treating fresh sludges in a minimum of space and equipment to convert the same into processed sludge suitable for delivery to sludge beds, the steps defined in claim 11 and further including the step of spraying said circulating sludge to destroy froth accumulations thereon and wherein said inoculated fresh sludge mixture comprises two parts of fresh sludge to one part of at least partially-processed sludge.

15. In a process of treating fresh sludges in a minimum of space and equipment to convert the same into processed sludge suitable for delivery to sludge beds, the steps defined in claim 11 wherein said inoculated fresh sludge mixture comprises two parts of fresh sludge to one part of at least partially-processed sludge.

References Cited in the file of this patent

UNITED STATES PATENTS

| | | |
|---|---|---|
| 2,188,847 | Streander | Jan. 30, 1940 |
| 2,777,815 | Forrest | Jan. 15, 1957 |
| 2,786,025 | Lamb et al. | Mar. 19, 1957 |
| 2,893,957 | Genter et al. | July 7, 1959 |